United States Patent [19]
Hanson

[11] Patent Number: 5,888,339
[45] Date of Patent: Mar. 30, 1999

[54] APPLICATOR APPARATUS FOR WRAPPING A JOINT OF PIPE WITH A WEB OF CONCRETE MATERIAL

[75] Inventor: George Hanson, Belle Chasse, La.

[73] Assignee: Bredero Price Company, Harvey, La.

[21] Appl. No.: 659,799

[22] Filed: Jun. 7, 1996

Related U.S. Application Data

[63] Continuation-in-part of Ser. No. 527,930, Sep. 14, 1995, Pat. No. 5,667,623.

[51] Int. Cl.$^6$ .................................................. B65H 81/00
[52] U.S. Cl. ........................ 156/367; 156/425; 156/429; 156/431; 156/450; 156/458
[58] Field of Search .................................. 156/367, 425, 156/429, 431, 450, 458

[56] References Cited

U.S. PATENT DOCUMENTS

| | | | |
|---|---|---|---|
| 1,979,656 | 11/1934 | Whitman | 154/1 |
| 2,037,043 | 4/1936 | Postlewaite | 25/30 |
| 2,135,208 | 11/1938 | Bray et al. | 91/54 |
| 2,269,032 | 1/1942 | Moore | 25/38 |
| 2,470,068 | 5/1949 | Contenson | 25/38 |
| 2,945,278 | 7/1960 | Robertson | 25/38 |
| 3,740,291 | 6/1973 | Mallard | 156/392 |
| 4,006,049 | 2/1977 | Gardner | 156/195 |
| 4,058,428 | 11/1977 | Case et al. | 156/429 |
| 4,333,783 | 6/1982 | Gardner | 156/187 |
| 4,544,426 | 10/1985 | Stockman | 156/73.6 |
| 4,611,635 | 9/1986 | Jarvis | 138/146 |
| 4,632,720 | 12/1986 | Meyer . | |
| 4,759,390 | 7/1988 | Jarvis et al. | 138/175 |
| 4,785,854 | 11/1988 | Jarvis et al. | 156/187 |
| 5,261,995 | 11/1993 | Golden . | |

FOREIGN PATENT DOCUMENTS

| | | |
|---|---|---|
| 5402/32 | 1/1932 | Australia . |
| 5702/32 | 1/1932 | Australia . |

*Primary Examiner*—Jenna Davis
*Attorney, Agent, or Firm*—Garvey, Smith, Nehrbass & Doody, L.L.C.

[57] ABSTRACT

An apparatus for wrapping a joint of pipe with a web of reinforced concrete includes an improved applicator that wraps the joint of pipe with a web of concrete that is reinforced with a steel mesh and which is also layered with a web of poly film. The improved applicator has a motor drive and a gear box that interfaces the motor drive with one of the belt pulleys that drives the applicator belt. The primary applicator belt can be disengaged from the pipe, thereby transferring both pulleys to idler pulleys after pipe wrapping is initiated. This allows the large motor drives that actually rotate the pipe to control the speed at which the web of concrete is applied to the pipe. The motor drive for the applicator belt is initially engaged for a few seconds to overcome initial friction associated with start up of the applicator. A timer can be used to regulate the number of seconds that the applicator motor operates until it is disengaged using the clutch.

20 Claims, 6 Drawing Sheets

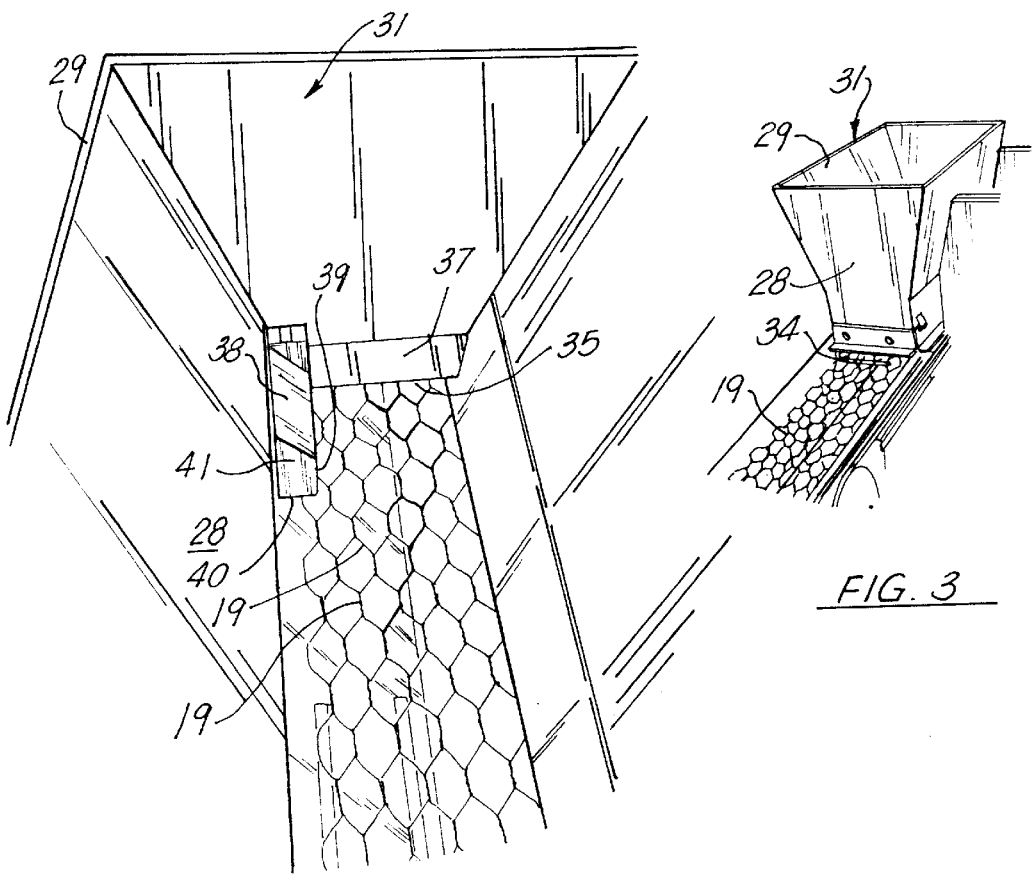
FIG. 3
FIG. 4
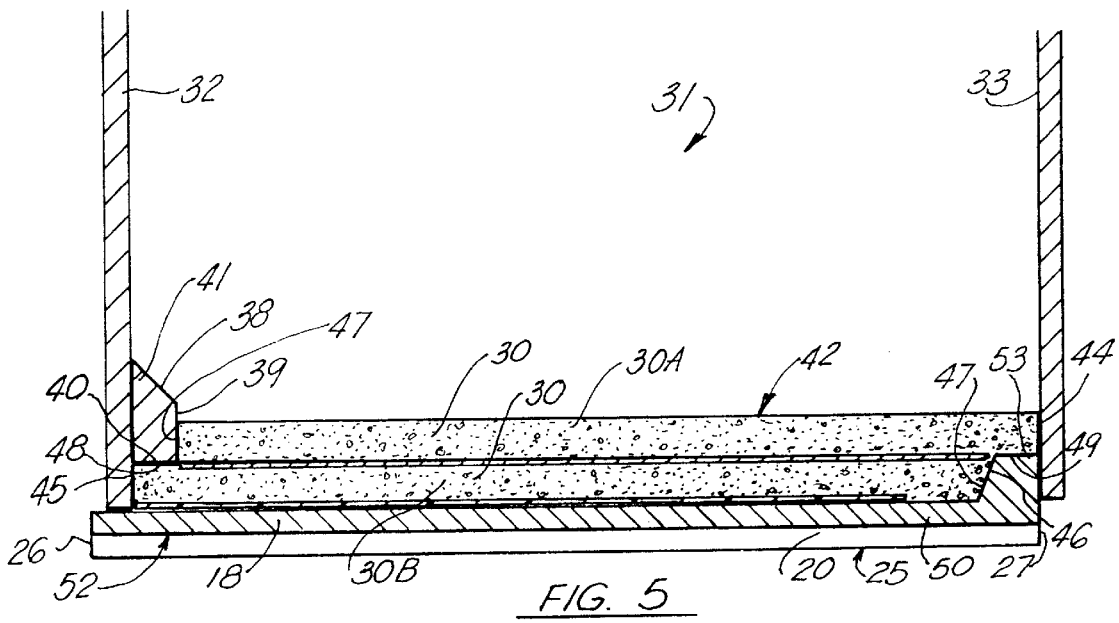
FIG. 5

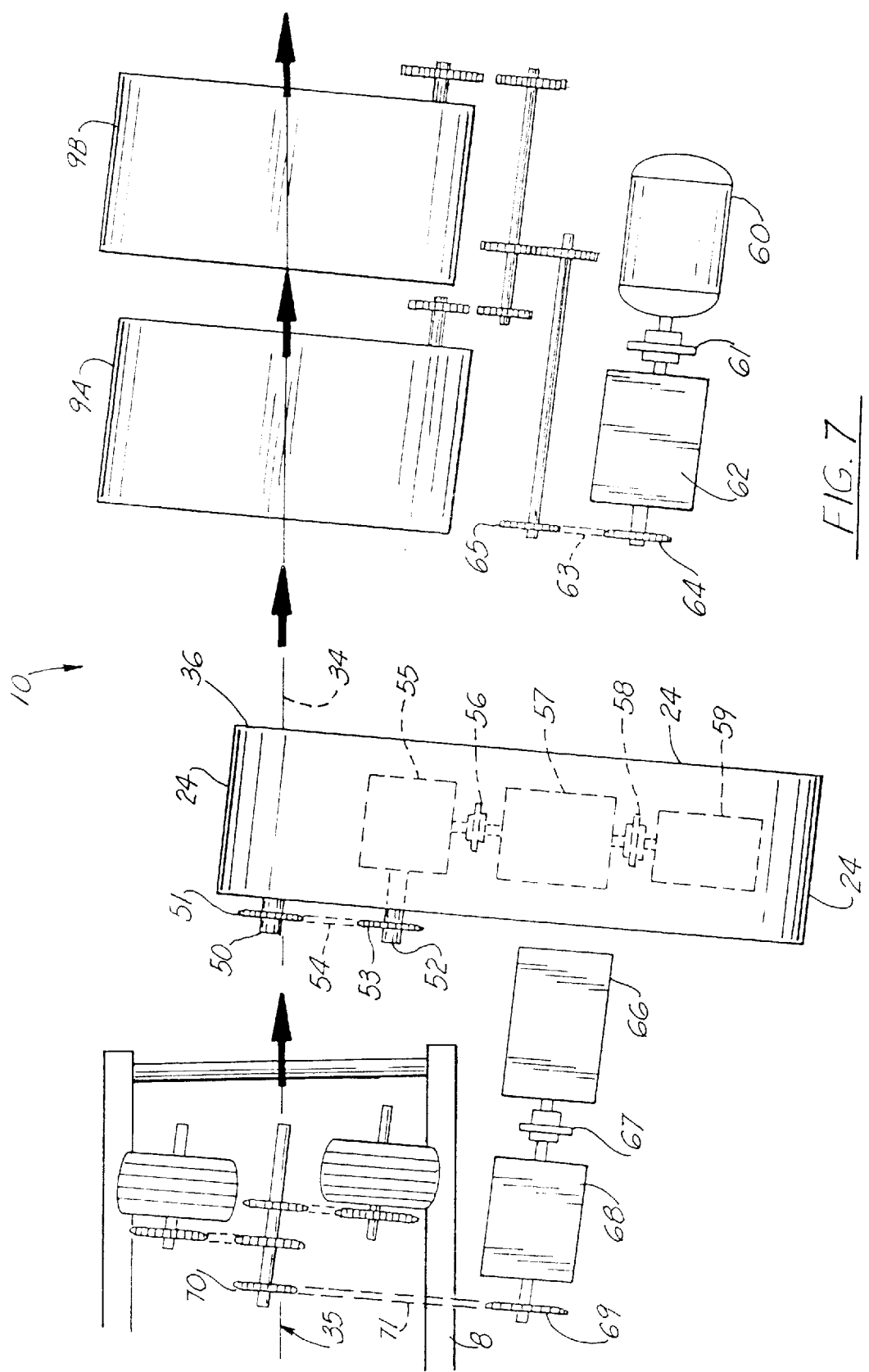

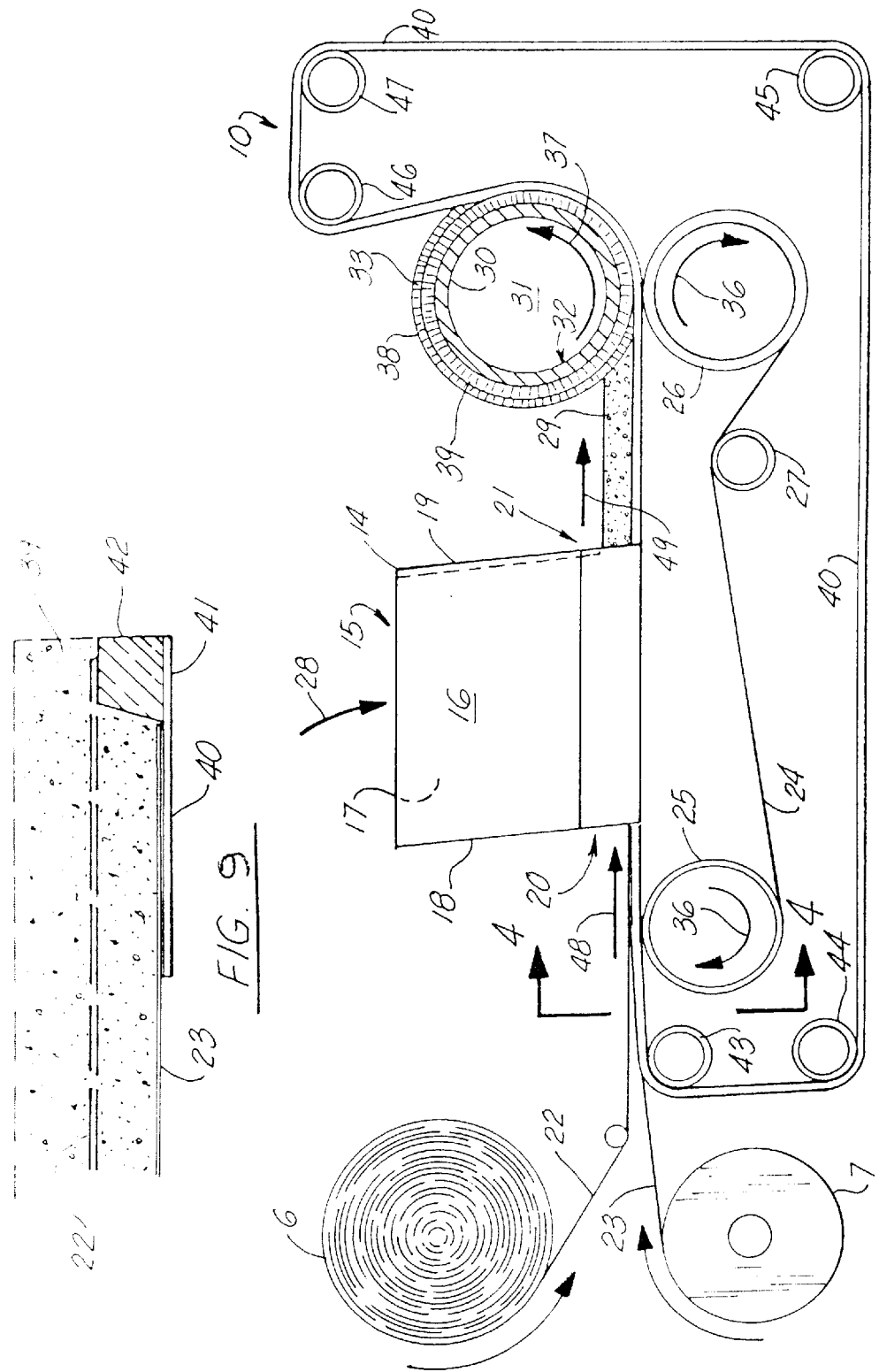

APPLICATOR APPARATUS FOR WRAPPING A JOINT OF PIPE WITH A WEB OF CONCRETE MATERIAL

CROSS REFERENCE TO RELATED APPLICATIONS

This is a continuation-in-part of U.S. patent application Ser. No. 08/527,930, filed Sep. 14, 1995 now U.S. Pat. No. 5,667,623 entitled "METHOD AND APPARATUS FOR WRAPPING A JOINT OF PIPE WITH A WEB OF CONCRETE MATERIAL", which is incorporated herein by reference.

BACKGROUND OF THE INVENTION

1. Field of the Invention

The present invention relates to the concrete coating of pipe and like tubular material, namely the spiral wrapping of a joint of pipe with an elongated continuous web of concrete and more particularly to an improved applicator apparatus for the wrapping of a joint of pipe with a web of concrete. More particularly, the present invention relates to an improved applicator apparatus that continuously spirally wraps the pipe with the web of concrete, the improved applicator including two endless belts, one main transport belt that supports the concrete from below and a second auxiliary belt that shapes an edge of the concrete web to provide an overlapping seam.

2. General Background

In the pipe coating industry, it is well known to spirally wrap a joint of pipe with a reinforced concrete web. Sometimes the web is thick, making the pipe very heavy for underwater installation. Early example of patents that discuss the spiral wrapping of a concrete web about a metal joint of pipe include for example Australian Patent No. 5702/32 dated Aug. 4, 1932 and entitled "PIPE COATING METHOD, MACHINE AND PRODUCT"; U.S. Pat. No. 1,979,656 issued Nov. 6, 1934 entitled "APPARATUS FOR WRAPPING PIPE"; and U.S. Pat. No. 2,037,043 issued Apr. 14, 1936 entitled "PIPE WRAPPING MACHINE". This technology was first commercially developed in about the late 1940's or the early 1950's by Compression Coat of Houston, Tex. Many patents have issued that were assigned to Compression Coat. Examples of compression coat patents include U.S. Pat. Nos. 4,006,049; 4,058,428; and 4,333,783. Each of these patents disclose or contemplate a mixture for mixing aggregate and cement to produce a concrete mass to be formed into a web, a mill for mixing water into the concrete mass, and a pipe conveyor for supporting, advancing and rotating a joint of pipe. This patent also discloses an applicator for wrapping the joint of pipe with a web of concrete, the applicator including an endless belt and a pair of pulleys that support the belt.

Pipe wrapping with concrete is usually accomplished by utilizing an elongated pipe conveyor that supports, advances, and rotates the pipe. A mobile head supports the front end portion of the pipe joint that has already been wrapped in concrete as it leaves an applicator. The applicator for wrapping the joint of pipe with a web of concrete can include an endless belt and a pair of pulleys that support the belt. The concrete web is typically transported to the pipe on the endless belt with a plastic film band placed under the concrete, between the concrete and the belt. Reinforcing wire can be fed from a roll to the endless belt for addition to the concrete web as reinforcement.

U.S. Pat. No. 1,979,656 (issued to N. Whitman in 1934); U.S. Pat. No. 2,037,043 (issued to Postlewaite in 1933); U.S. Pat. No. 3,740,291 (issued to J. B. Mallard in 1973); U.S. Pat. No. 4,006,049 (issued to Garner Feb. 1, 1977); U.S. Pat. No. 4,058,428 (issued Nov. 15, 1977 to Case et al.); U.S. Pat. No. 4,333,783 issued to Gardner Jun. 8, 1982); and U.S. Pat. No. 4,544,426 (issued to Stockman Oct. 1, 1985) all disclose pipe wrapping devices that spirally wrap the pipe with a web of concrete that is fed with an applicator belt to the pipe on a layer of plastic, reinforced with wire. In some of these patents, the plastic film layer and reinforcing wire are fed continuously from a roll (see FIG. 3 of U.S. Pat. No. 4,058,428 and FIG. 1 of U.S. Pat. No. 4,333,783).

The Whitman U.S. Pat. No. 1,979,656 relates to the wrapping of steel pipe with a mortar shell. The method of the Whitman patent includes the step of placing a spiral layer of mortar around the steel pipe and binding the same in place with an outer layer of material which may be fabric or other suitable material such as wire mesh or suitably prepared paper. When the coating process is completed, the binding material becomes a permanent part of the covering and provides the means of holding the mortar in place around the pipe. It also acts as a means of protecting the coating during handling. The Whitman device provides a means of rotatably supporting a section of pipe to be wrapped. A table is movable longitudinally of the pipe. The table having means for applying a preliminary coating of grout to the pipe. The table also having means for supporting a continuous tape arranged to be spirally wound around the pipe over the preliminary coating. The table also allows a layer of mortar to be deposited on the tape before it is wounded around the pipe.

The Postlewaite U.S. Pat. No. 2,037,043 relates to a machine for wrapping cylindrical objects (such as pipe) with a relatively thick coating of plastic material (such as a bituminous or cementitious mastic) which hardens or sets to form a firm adherent protective layer. The '043 patent is also directed to a method of and a means for applying such plastic material on a continuous tape or band of flexible material which is smoothly and uniformly lapped at the joints between adjacent turns. The machine of the '043 patent includes a shoot disposed at an angle to the pipe and space therefrom, the shoot adapted to guide a flexible tape to be wrapped helically around the pipe by relative motion thereof. Plastic material is supplied onto the tape whereby a continuous coating of appreciable thickness is formed on the pipe beneath the tape.

Australian patent 5702/32 issued in 1931 to Warren Kraner disclosed a process that includes the steps of continuously forming a layer of plastic concrete from a mass and continuously covering the layer away from the mass and continuously wrapping the layer spirally upon a pipe. The layer was formed with a reinforcing strip like wire screening embedded within the strip. The edges of the convolutions applied to the form lapped and then compacted. A strip of surfacing material will simultaneously wound upon the exterior of concrete applied to the pipe form. The Kraner patent also disclosed a means for supporting and rotating a pipe to be coated and a hopper is adapted to receive a mass of concrete. The hopper is adapted to receive a mass of concrete. The hopper included a lower discharge opening for guiding a strip of material like wire screening beneath the opening whereby concrete fed through the opening was distributed upon both sides of the strip. The strip together with the layer of concrete covering both sides of the same was then wound spirally on the pipe.

One of the problems that can occur in the application of the web of material to the pipe is that of overlapping the web "wraps" so that the concrete coating is continuous.

This overlapping of the wraps must also be accomplished at relatively high speed. The pipe is advancing along the line that coincides with the central longitudinal axis of the pipe joint. At the same time, the pipe is being advanced and rotated with driven pipe rollers. The applicator must feed the web of concrete to the pipe, matching the speed of the web with the speed of rotation of the outer surface of the pipe. At the same time, the newest wrapped that is added to the pipe must fit the edge of the previous wrap.

An overlapping seam is preferably provided, eliminating any gaps or void spaces from one wrap of concrete to the next.

Trimming devices create a problem because concrete contains aggregate that can form a discontinuous or irregular portion at an edge of the web when that piece of aggregate hits the trimming device. Therefore, it is an object of the present invention to provide an improved applicator that has a secondary belt with a raise portion along one edge that defines the desired overlapping shape to the edge of the web.

It is another object of the present to provide an endless belt arrangement that continuously supports the web of concrete during application of the web directly to the pipe, wherein the web holds the concrete to the pipe through a measure of about ninety (90°) degrees of travel.

SUMMARY OF THE INVENTION

The present invention provides an improved applicator for wrapping the joint of pipe with the web of concrete. The applicator includes a first endless transport belt having a pair of pulleys that support the belt under a concrete mill and hopper, so that a concrete mix can be deposited on the endless transport belt. A mobile belt head is provided for supporting the portion of the pipe joint that has been wrapped in concrete. A pipe conveyor support rotates and advances the joint of pipe to be wrapped.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 3 is a partial perspective view of the preferred embodiment of the apparatus of the present invention; and FIG. 4 is a partial perspective view illustrating the preferred embodiment of the apparatus of the present invention;

FIG. 5 is an elevational sectional view of the preferred embodiment of the apparatus of the present invention;

FIG. 7 is a partial plan view of a pipe coating applicator for wrapping concrete as used with the preferred embodiment of the apparatus of the present invention;

FIG. 8 is a partial side view of a pipe coating applicator for wrapping concrete as used with the preferred embodiment of the apparatus of the present invention; and FIG. 9 is a fragmentary sectional view of a pipe coating applicator for wrapping concrete as used with the preferred embodiment of the apparatus of the present invention.

DETAILED DESCRIPTION OF THE PREFERRED EMBODIMENT

Figure 1:
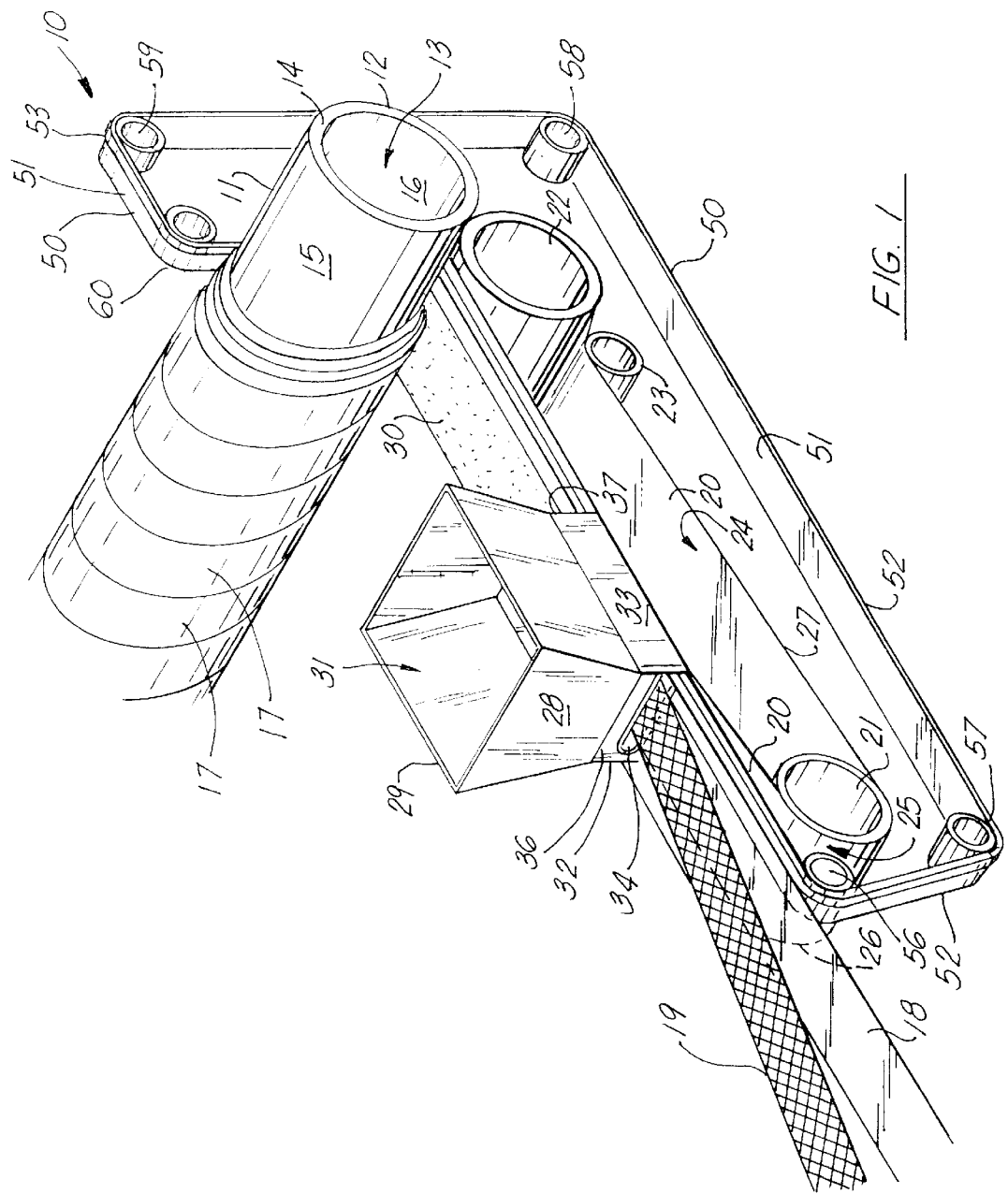
FIG. 1 is a perspective view of a pipe coating applicator for wrapping pipe with concrete as used with the preferred embodiment of the apparatus of the present invention.

FIG. 1 shows generally the preferred embodiment of the apparatus of the present invention designated generally by the numeral 10. In FIG. 1 applicator 10 is shown applying a web of concrete 30 to an elongated joint of pipe 11. Pipe joint 11 can be for example a forty (40) foot joint of pipe of typical diameter such as four (4') inch, six (6') inch, eight (8') inch, ten (10') inch or larger. Pipe joint 11 has an end portion 12, a central longitudinal cylindrical bore 13 and a pipe wall 14 of desired thickness depending upon the service to which the pipe is applied. Pipe joint 11 has an outer surface 15 that is cylindrically shaped and a correspondingly shaped inner surface 16 as shown.

With the present invention, a plurality of wraps 17 as shown. A plastic film web 18 is conveyed to first endless belt 20. Above the plastic film web 18 is placed and conveyed a wire reinforcing web 19 as shown in FIG. 1. These webs 18, 19 can begin as spools of plastic film and of reinforcing wire spaced away from first endless belt 20.

First endless belt 20 is supported with a pair of spaced apart pulleys 21, 22. A third pulley 23 can be used to tension belt 20. Belt 20 has an inner surface 24 and an outer surface 25 that engages the concrete web 30 during use. Belt 20 has left and right edge portions 26, 27.

A hopper 28 is positioned above belt 20. The hopper 28 is designed to receive concrete from a mill (not shown) and shape that concrete into the form of web 30 for application to pipe joint 15. Hopper 28 includes an upper edge 29, and open top 31, a side walls 32, 33, front wall 36 and rear wall 37. An inlet 34 receives plastic film web 18 and wire reinforcing web 19. A rear wall 37 has an outlet opening 35 for discharging web 30 from hopper 28. As discharged from hopper 28, the concrete web 30 is reinforced with reinforcing wire 19 and is sealed below against leakage with plastic web 18.

FIGS. 3–5 show the inside of hopper 28. A foot 38 is used to shape one edge of concrete web 30 as shown in FIGS. 4 and 5. The shoe 38 has a vertical flange 39, an inclined flange 38, a bottom horizontally extending flange 40, and end plate 41 that engages the incoming web 30 of concrete.

Concrete web 30 is shown more particularly in FIG. 5 as having an upper surface 42 and a lower surface 43. The upper and lower surfaces 42, 43 are each flat and generally parallel. The concrete web 30 includes an upper section having vertical surfaces 44, 45.

Figure 2:
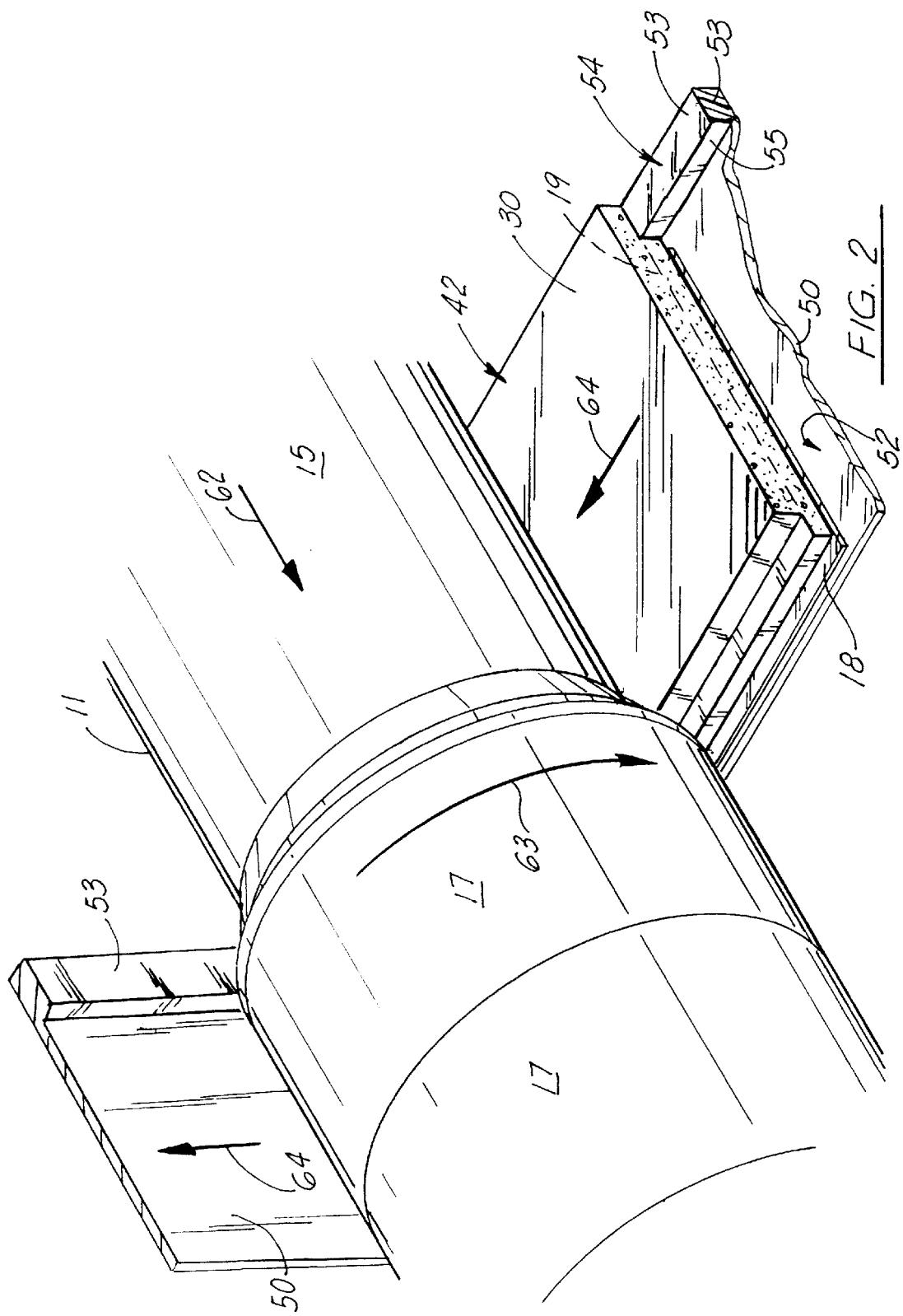
FIG. 2 is a partial perspective view of the preferred embodiment of the apparatus of the present invention.
Figure 6:
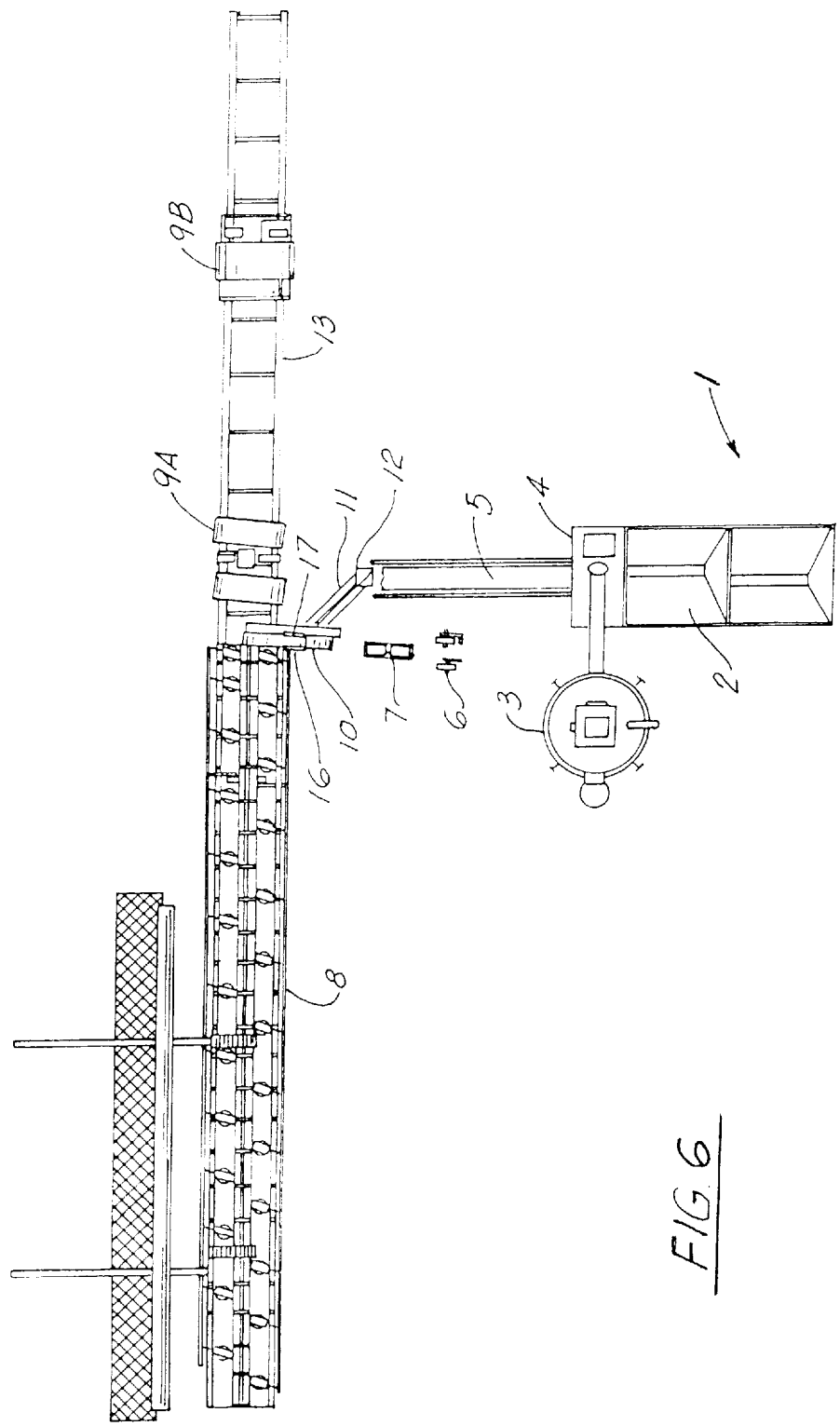
FIG. 6 is a plan view of a pipe coating applicator for wrapping concrete as used with the preferred embodiment of the apparatus of the present invention.

A secondary endless belt 50 provides a raised portion 53 that shapes a portion of one side of web 30 as shown in FIGS. 2 and 5. Secondary belt 50 has an inside surface 51 and an outer surface 52. The raised portion 53 has a horizonal surface 54 that forms a flat under cut horizontal surface 49 along one edge of web 30 as shown in FIG. 5. Raised portion 53 has an inclined surface 55 that forms a similarly inclined surface portion 47 to the lower half 30B of web 30. In FIG. 5, the upper half 30A of web 30 is that portion above wire reinforcing web 19. The portion of web 30 below web 19 is defined as the lower portion 30B of concrete web 30.

As shown in FIG. 1, secondary endless belt 50 is supported with a plurality of pulleys 56–60. During a wrapping of pipe 11 with concrete web 30, both the primary web 20 and the secondary web 50 extend about ninety to one hundred twenty degrees (90°–120°) about pipe 11 outer surface 15. In this manner, the belts 20, 50 hold the web 30 of concrete against the pipe 11 until an overlapping occurs.

The pipe joint 11 is advanced in the direction of arrow 62 in FIG. 2. At the same time, the pipe joint 11 is rotated in the direction of arrow 63. Belts 20, 50 are traveling in the direction of arrow 64. This simultaneous advancing and rotating of pipe joint 11 can be achieved with commercially available pipe roller support equipment, such as that disclosed in copending application Ser. No. 08/527,930, filed Sep. 14, 1995, now U.S. Pat. No. 5,667,623, incorporated herein by reference.

In FIG. 1, there can be seen an overall plan view of a wrap-on concrete plant designated generally as 1. Concrete plant 1 includes a hopper feed and metering unit 2 and cement silo 3, a cement feed and metering unit 4 and a feed conveyor 5. Additionally, a wire payoff unit 6 and a poly film payoff unit 7 are used for directing a web of reinforcing wire and a web of poly film to the applicator 110 of the present invention. An inbound spiral conveyor 8 transports an elongated joint of pipe (for example a 40 ft. joint) to the applicator 110. Belt head 9 supports the coated end portion of the joint of pipe after is passes applicator 110.

Applicator 110 is shown in more detail in FIGS. 2 and 3. The applicator 110 receives a flow of cement from material mixing unit 111 and water meter unit 112. Thus, when the cement mixture reaches applicator 110, it is a combination of cement, aggregate, and water.

An elongated track 113 can support a second belt head 9b that typically is a moving belt head.

It should be understood that the overall layout of a wrap on concrete plant is well known in the art. Thus, the use of a concrete plant having a hopper feed and metering unit, a cement silo, a cement feed and metering unit, and a feed conveyor are well known. Additionally, it is known in the art to use a wire payout unit and a poly film payoff unit to supply a web of reinforcing wire and poly film respectively to pipe to be wrapped. Additionally, the use of an inbound spiral conveyor to convey the pipe joint to be wrapped is known in the art. Further, it is known in the art to use an elongated track 113 to support the pipe after it has been wrapped using one or more belt heads 9a, 9b for example.

Applicator 110 more particularly includes an applicator hopper 114 having an open top 115 side walls 116, 117 and end walls 118, 119. The hopper 114 provides an open inlet 120 that allows belt 124 to travel through the hopper 116 so that a concrete mix can be deposited on endless belt 124 for applicator to pipe 130.

Applicator hopper 114 also provides an outlet gate 121 of a desired size and shape for defining the cross-sectional area of a concrete web 129 to be applied to the pipe joint 130.

An incoming wire mesh web 122 and an incoming poly film incoming web 123 are supplied via roll 6 and roll 7 to the endless applicator belt 124 as shown in FIG. 3. Endless applicator belt 124 is supported by a plurality of pulleys 125–127.

During use, arrow 128 indicates that addition of concrete to the open top 115 of hopper 114 as endless belt 124 advances in the direction of arrows 148, 149 concrete mix added to hopper 115 exits outlet gate 121 as shown in FIG. 3.

A second endless belt 140 is used to conform the web 129 of concrete to the outer surface 133 of pipe joint 130. In FIG. 3, the bore 131 of pipe joint 130 as shown as is the inside surface 132 of pipe joint 130 and its outside surface 133. Arrow 137 in FIG. 3 indicates the direction of rotation of the pipe joint 130. Arrows 136 indicate the direction of rotation of pulleys 125, 126. Pipe 130 desirably sits upon pulley 126. The pulley 126 can be a driven pulley as shown in FIG. 2, being driven by drive shaft 150.

In FIG. 2, pipe 130 has a central longitudinal axis 134 that is also the central longitudinal axis 135 of inbound spiral conveyor 8. In FIG. 3, the web of concrete 129 has been applied to the outer surface 133 of pipe joint 130, thus creating a concrete coating 138 that is spirally wrapped. The applicator belt 124 is off-set by an acute angle with respect to the axis 134, 135. This creates a spiraling application of the concrete web 129 to the outer surface 133 of pipe joint 130.

A stepped leading edge 139 is formed by forming belt 140 as the concrete web 129 is wrapped onto outer surface 133 of pipe joint 130. Forming belt 140 as shown in FIG. 4 includes a wider flat portion 141 that is preferably the same width as or slightly smaller than the width of belt 124. Forming belt 140 also includes thinner raised portion 142 that creates a step at one edge of concrete web 129 as shown in FIG. 4. Forming belt 140 is supported upon a plurality of rollers or pulleys 143–149 as shown in FIG. 3. Arrows 148, 149 indicate the direction of travel of the forming belt 140 during use.

In FIG. 2, drive shaft 152 is shown connected to sprocket 151 for driving pulley 136. Sprockets 151 and 152 are connected by chain 154. Drive shaft 152 is connected to clutch 155. Clutch 155 is coupled to gear box 157 with coupling 156. Gear Box 157 rotates, being driven by motor drive 159 that is coupled to gear box 157 at coupling 158. During use, the clutch 155 can be disengaged so that the pulley 136 becomes either a driven pulley or an idler pulley as desired. This is important because the wrapping of pipe is desirably performed by imparting a rotation to the pipe of joint with two drive motors 160 and 166 rather than by the drive motor 159. This allows the drive motor 159 to be much smaller, thus only acting as a start up for the pulley 136 when pipe wrapping is initiated. After that, the clutch 155 is disengaged so that the drive motor 160 and 166 actually rotate the joint of pipe.

In FIG. 2, the drive motor 160 is connected via coupling 161 to gear box 162. Gear box 162 drives sprocket 164 and sprocket 165, the sprockets 164, 165 being connected with chain 163. Additional shafts and sprockets can be used to drive belt heads 9a, 9b with motor 160. Inbound spiral conveyor 8 is driven by drive motor 166, coupling 167, gear box 168, and sprocket 169, 170 connected by chain 171. The aforementioned apparatus 110 allows the two larger drive motors 160, 166 to control rotation of the pipe. Because the pipe is very heavy, it must be supported during the wrapping operation by inbound spiral conveyor 8 and belt heads 9a, 9b. Thus, much heavier motor 160 and 166 are required to drive the pipe supporting inbound spiral conveyor 180 and the pipe supporting belt heads 9a, 9b. The applicator 110 however desirably only supports the weight of the concrete web and not the full weight of the pipe being coated. Therefore, the apparatus of the present invention allows a disengagement of motor drive 159 and its gear box 157 from pulley 136 once an initial momentum is built up in the pulley 136 and the pipe joint 130. This occurs when pipe wrapping first starts. Thereafter, the clutch 155 disengages so that the pipe joint being coated is supported and rotated by the inbound spiral conveyor 8, its drive motor and gear box 166–168 and the belt heads 9a–9b and their associated drive motor and gear box 160–162. The belts 20, 50 and their support pulleys as well as the hopper 28 are aligned at a slight angle with respect to the central longitudinal axis of the pipe 11 so that overlapping occurs as the pipe 11 is rotated and advanced. The speed of the belts 20, 50 is synchronized with the speed of the pipe 11 movement so that a smooth overlap occurs between wraps of concrete 17.

With the teachings of the present invention, wrap 17 can be applied to pipe joint 11 by continuously feeding concrete into hopper 13 and by continuously feeding film layer 18 and reinforcing wire 19. Either or both of the pulleys 20, 22 can be driven. In the preferred embodiment, the pulley 22 is driven. The pulley 22 frictionally engages the bottom of pipe 11 so that the pulley 22 and pipe 11 rotate at the same speed. The belts 20, 50 are sandwiched therebetween and likewise move at the same speed so that the belts 20, 50 and pipe 11 and pulley 22 are synchronized during application of concrete web 30 to the outer surface 15 of pipe joint 11.

The following table lists the parts numbers and parts descriptions as used herein and in the drawings attached hereto.

PARTS LIST

| Part Number | Description |
|---|---|
| 1 | concrete plant |
| 2 | hopper, feed and metering unit |
| 3 | cement silo |
| 4 | cement feed and metering |
| 5 | feed conveyor |
| 6 | wire payoff unit |
| 7 | poly film payoff unit |
| 8 | inbound pipe conveyor |
| 9a | belthead |
| 9b | belthead |
| 10 | applicator |
| 11 | pipe |
| 12 | end portion |
| 13 | bore |
| 14 | pipe wall |
| 15 | outer surface |
| 16 | inner surface |
| 17 | wraps of concrete |
| 18 | plastic film web |
| 19 | wire reinforcing web |
| 20 | first endless belt |
| 21 | pulley |
| 22 | pulley |
| 23 | pulley |
| 24 | inner surface |
| 25 | outer surface |
| 26 | edge |
| 27 | edge |
| 28 | hopper |
| 29 | upper edge |
| 30 | concrete web |
| 30A | upper web section |
| 30B | lower web section |
| 31 | open top |
| 32 | side wall |
| 33 | side wall |
| 34 | inlet |
| 35 | outlet |
| 36 | front wall |
| 37 | rear wall |
| 38 | shoe |
| 39 | vertical flange |
| 40 | bottom flange |
| 41 | inclined flange |
| 42 | upper surface |
| 43 | lower surface |
| 44 | vertical surface |
| 45 | vertical surface |
| 46 | inclined surface |
| 47 | vertical surface |
| 48 | horizontal surface |
| 49 | horizontal surface |
| 50 | secondary endless belt |
| 51 | inner surface |
| 52 | outer surface |
| 53 | raised portion |
| 54 | horizontal surface |

-continued

PARTS LIST

| Part Number | Description |
|---|---|
| 55 | inclined surface |
| 56 | pulley |
| 57 | pulley |
| 58 | pulley |
| 59 | pulley |
| 60 | pulley |
| 61 | pulley |
| 62 | arrow |
| 63 | arrow |
| 64 | arrow |
| 110 | applicator |
| 111 | material mixing unit |
| 112 | water meter unit |
| 113 | track |
| 114 | applicator hopper |
| 115 | open top |
| 116 | side wall |
| 117 | side wall |
| 118 | end wall |
| 119 | end wall |
| 120 | inlet |
| 121 | outlet gate |
| 122 | wire mesh incoming web |
| 123 | poly film incoming web |
| 124 | endless applicator belt |
| 125 | pulley |
| 126 | pulley |
| 127 | pulley |
| 128 | arrow, concrete addition |
| 129 | web of concrete |
| 130 | pipe joint |
| 131 | pipe bore |
| 132 | inside surface |
| 133 | outer surface |
| 134 | pipe central longitudinal axis |
| 135 | roller central longitudinal axis |
| 136 | curved arrow |
| 137 | curved arrow |
| 138 | concrete coating |
| 139 | stepped leading edge |
| 140 | forming belt |
| 141 | wider flat portion |
| 142 | thinner raised portion |
| 143 | roller |
| 144 | roller |
| 145 | roller |
| 146 | roller |
| 147 | roller |
| 148 | arrow |
| 149 | arrow |
| 150 | drive shaft |
| 151 | sprocket |
| 152 | drive shaft |
| 153 | sprocket |
| 154 | chain |
| 155 | clutch |
| 156 | coupling |
| 157 | gear box |
| 158 | coupling |
| 159 | motor drive |
| 160 | motor drive |
| 161 | coupling |
| 162 | gear box |
| 163 | chain |
| 164 | sprocket |
| 165 | sprocket |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An application apparatus for wrapping a joint of advancing pipe with a web of reinforced concrete comprising:
    a) an applicator for wrapping the joint of advancing pipe with the web of concrete, said applicator including a first endless belt with an upper surface and a pair of pulleys that support the belt;
    b) a secondary belt that engages the upper surface of the first endless belt, said second endless belt having belt edges, one of said edges carrying an elevated portion that extends above the surface of the second endless belt;
    c) a wire reinforcing wrap web that is fed to the first and second endless belts and in a position that places the wire web immediately above the aligned endless belts;
    d) a web of plastic film that is positioned in between the wire reinforcing web and the two endless belts;
    e) a hopper for feeding concrete to the assembly of the two aligned webs, the plastic web and the reinforcing web;
    f) a plurality of pulleys for conforming the second endless belt to the pipe joint to be coated through a measure of about ninety (90°) degrees, said plurality of pulleys including at least one pulley that extends to a position above the pipe central longitudinal axis.

2. The apparatus of claim 1 further comprising a clutch means that comprises a remotely operable clutch that can be engaged or disengaged from a remote location.

3. The apparatus of claim 2 wherein the clutch can be disengaged after rotating of a pipe joint to be coated has been commenced.

4. The apparatus of claim 1 further comprising a gear box and a third motor drive and a drive shaft that extends between the third motor drive and the gear box and the clutch means is positioned on the drive shaft.

5. The apparatus of claim 1 further comprising a mobile head that is supported upon a frame along a longitudinal line that is coincident with the central longitudinal axis of the pipe joint to be wrapped.

6. The apparatus of claim 1 further comprising a pipe conveyor means that includes an elongated frame having a series of rollers thereon that continuously support the pipe joint to be wrapped along its length.

7. The apparatus of claim 2 wherein the clutch means is electrically operated.

8. The apparatus of claim 2 wherein the clutch means comprises a pair of clutch disk members that are movable between disengaged and engaged positions, and wherein the clutch disks are spaced apart in the disengaged position.

9. The apparatus of claim 5 further comprising first and second motor drives for driving the belts and that have coordinated rotational speeds during use so that the pipe conveyor and the mobile belt head correspondingly rotate the pipe joint to be wrapped at the same revolutions per minute.

10. An application apparatus for wrapping a joint of pipe with a web of reinforced concrete comprising:
    a) an applicator for wrapping the joint of advancing pipe with the web of concrete, said applicator including a first endless belt with an upper surface and a pair of pulleys that support the belt;
    b) a secondary belt that engages the upper surface of the first endless belt, said second endless belt having belt edges, one of said edges carrying an elevated portion that extends above the surface of the second endless belt;
    c) a wire reinforcing wrap web that is fed to the first and second endless belts and in a position that places the wire web immediately above the aligned endless belts;
    d) a web of plastic film that is positioned in between the wire reinforcing web and the two endless belts;
    e) a hopper for feeding concrete to the assembly of the two aligned webs, the plastic web and the wire reinforcing web;
    f) a plurality of pulleys for conforming the second endless belt to the pipe joint to be coated, said plurality of pulleys including at least one pulley that extends to a position above the central longitudinal axis of the advancing pipe.

11. The apparatus of claim 10 wherein there are two pulleys that extend to a position above the central longitudinal axis of the advancing pipe.

12. The apparatus of claim 10 wherein the hopper gravity feeds concrete to the assembly of aligned webs, plastic web and wire reinforcing web.

13. The apparatus of claim 10 wherein the first belt is supported by a pair of pulleys.

14. The apparatus of claim 10 wherein the second belt is supported by at least three pulleys.

15. The apparatus of claim 10 wherein the second belt is supported by at least four pulleys.

16. The apparatus of claim 10 further comprising a clutch means that comprises a remotely operable clutch that can be engaged or disengaged from a remote location.

17. The apparatus of claim 16 wherein the clutch can be disengaged after rotating of a pipe joint to be coated has been commenced.

18. The apparatus of claim 10 further comprising a mobile head that is supported upon a frame along a longitudinal line that is coincident with the central longitudinal axis of the pipe joint to be wrapped.

19. The apparatus of claim 18 further comprising a gear box and a third motor drive and a drive shaft that extends between the third motor drive and the gear box and the clutch means is positioned on the drive shaft.

20. The apparatus of claim 10 further comprising a pipe conveyor means that includes an elongated frame having a series of rollers thereon that continuously support the pipe joint to be wrapped along its length.

* * * * *